US008532798B2

(12) United States Patent
Ferraro, III et al.

(10) Patent No.: US 8,532,798 B2
(45) Date of Patent: Sep. 10, 2013

(54) PREDICTING OUTCOMES OF FUTURE SPORTS EVENTS BASED ON USER-SELECTED INPUTS

(75) Inventors: Joseph W. Ferraro, III, Livingston, NJ (US); Dennis O. Dowd, West Orange, NJ (US)

(73) Assignee: Longitude LLC, New York, NY (US)

( * ) Notice: Subject to any disclaimer, the term of this patent is extended or adjusted under 35 U.S.C. 154(b) by 21 days.

(21) Appl. No.: 13/215,640

(22) Filed: Aug. 23, 2011

(65) Prior Publication Data

US 2013/0053991 A1 Feb. 28, 2013

(51) Int. Cl.
*G06F 17/00* (2006.01)

(52) U.S. Cl.
USPC ........................ 700/91; 463/7; 463/9; 463/42

(58) Field of Classification Search
USPC ............. 463/42, 4, 7, 16, 28, 40; 700/91–93; 705/36 R, 7.28; 725/57; 707/722, 769
See application file for complete search history.

(56) References Cited

U.S. PATENT DOCUMENTS

| | | | | |
|---|---|---|---|---|
| 4,903,201 | A | 2/1990 | Wagner | |
| 5,101,353 | A | 3/1992 | Lupien et al. | |
| 5,148,365 | A | 9/1992 | Dembo | |
| 5,220,500 | A * | 6/1993 | Baird et al. | 705/36 R |
| 5,275,400 | A | 1/1994 | Weingardt et al. | |
| 5,313,560 | A | 5/1994 | Maruoka et al. | |
| 5,524,187 | A | 6/1996 | Feiner et al. | |
| 5,564,701 | A | 10/1996 | Dettor | |
| 5,573,244 | A | 11/1996 | Mindes | |
| 5,608,620 | A | 3/1997 | Lundgren | |
| 5,672,106 | A | 9/1997 | Orford et al. | |
| 5,749,785 | A | 5/1998 | Rossides | |
| 5,794,207 | A | 8/1998 | Walker et al. | |
| 5,799,287 | A | 8/1998 | Dembo | |
| 5,806,048 | A | 9/1998 | Kiron et al. | |
| 5,819,237 | A | 10/1998 | Garman | |
| 5,842,921 | A | 12/1998 | Mindes et al. | |
| 5,845,266 | A | 12/1998 | Lupien et al. | |
| 5,873,782 | A | 2/1999 | Hall | |

(Continued)

FOREIGN PATENT DOCUMENTS

| | | |
|---|---|---|
| JP | 64-019496 U | 1/1989 |
| JP | 11-501423 | 2/1999 |

(Continued)

OTHER PUBLICATIONS

Abraham Silberschatz and Peter B. Galvin, Operating System Concepts, 1994, Addison-Wesley Publishing Company, Inc., 4th edition, p. 20.

(Continued)

*Primary Examiner* — Dmitry Suhol
*Assistant Examiner* — Jason Yen
(74) *Attorney, Agent, or Firm* — Kenyon & Kenyon LLP

(57) ABSTRACT

A system and method for event outcome prediction may include a processor configured to receive via a user interface a user-selection of a subset of a plurality of listed statistical categories, and rank participants of the event based selectively on analysis of the statistical information concerning the selected subset of categories. The system may output the ranked list as a predicted outcome, and may further output a user interface via which to place a bet on the predicted outcome.

14 Claims, 10 Drawing Sheets

(56) References Cited

U.S. PATENT DOCUMENTS

| | | | |
|---|---|---|---|
| 5,911,136 A | 6/1999 | Atkins | |
| 5,970,479 A | 10/1999 | Shepherd | |
| 6,061,662 A | 5/2000 | Makivic | |
| 6,078,904 A | 6/2000 | Rebane | |
| 6,085,175 A | 7/2000 | Gugel et al. | |
| 6,134,536 A | 10/2000 | Shepherd | |
| 6,247,000 B1 | 6/2001 | Hawkins et al. | |
| 6,263,321 B1 | 7/2001 | Daughtery, III | |
| 6,278,981 B1 | 8/2001 | Dembo et al. | |
| 6,317,728 B1 | 11/2001 | Kane | |
| 6,321,212 B1 | 11/2001 | Lange | |
| 6,336,103 B1 | 1/2002 | Baker | |
| 6,379,248 B1 | 4/2002 | Jorasch et al. | |
| 6,394,895 B1 | 5/2002 | Mino | |
| 6,408,282 B1 | 6/2002 | Buist | |
| 6,418,417 B1 | 7/2002 | Corby et al. | |
| 6,418,419 B1 | 7/2002 | Nieboer et al. | |
| 6,443,838 B1 | 9/2002 | Jaimet | |
| 6,456,982 B1 | 9/2002 | Pilipovic | |
| 6,468,156 B1 | 10/2002 | Hughs-Baird et al. | |
| 6,554,708 B1 * | 4/2003 | Brenner et al. | 463/40 |
| 6,554,709 B1 | 4/2003 | Brenner et al. | |
| 6,594,643 B1 | 7/2003 | Freeny, Jr. | |
| 6,601,044 B1 | 7/2003 | Wallman | |
| 6,712,701 B1 * | 3/2004 | Boylan, III et al. | 463/42 |
| 7,020,632 B1 | 3/2006 | Kohls et al. | |
| 7,172,508 B2 | 2/2007 | Simon et al. | |
| 7,742,972 B2 | 6/2010 | Lange et al. | |
| 8,099,182 B1 * | 1/2012 | Kasten | 700/91 |
| 8,118,675 B2 * | 2/2012 | Horowitz et al. | 463/42 |
| 8,131,620 B1 * | 3/2012 | Steinberg et al. | 705/36 R |
| 2001/0044767 A1 | 11/2001 | Madoff et al. | |
| 2001/0047291 A1 | 11/2001 | Garahi et al. | |
| 2001/0051540 A1 | 12/2001 | Hindman et al. | |
| 2002/0032644 A1 | 3/2002 | Corby et al. | |
| 2002/0052819 A1 | 5/2002 | Burton | |
| 2002/0073018 A1 | 6/2002 | Mulinder et al. | |
| 2002/0123954 A1 | 9/2002 | Hito | |
| 2004/0005926 A1 * | 1/2004 | LeFroy | 463/42 |
| 2004/0006528 A1 | 1/2004 | Fung | |
| 2004/0006529 A1 | 1/2004 | Fung | |
| 2004/0006534 A1 | 1/2004 | Fung | |
| 2004/0039670 A1 | 2/2004 | Fung | |
| 2004/0043810 A1 * | 3/2004 | Perlin et al. | 463/16 |
| 2004/0054617 A1 | 3/2004 | Fung | |
| 2004/0153375 A1 | 8/2004 | Mukunya et al. | |
| 2005/0125341 A1 * | 6/2005 | Miri et al. | 705/39 |
| 2006/0112099 A1 * | 5/2006 | Musgrove et al. | 707/7 |
| 2006/0183548 A1 * | 8/2006 | Morris et al. | 463/42 |
| 2007/0022025 A1 * | 1/2007 | Litman et al. | 705/30 |
| 2007/0192312 A1 * | 8/2007 | Carnahan et al. | 707/5 |
| 2008/0066111 A1 * | 3/2008 | Ellis et al. | 725/57 |
| 2008/0086223 A1 * | 4/2008 | Pagliarulo | 700/91 |
| 2008/0140477 A1 * | 6/2008 | Tevanian et al. | 705/7 |
| 2008/0248850 A1 * | 10/2008 | Schugar | 463/16 |
| 2008/0274815 A1 * | 11/2008 | Root | 463/48 |
| 2009/0259566 A1 * | 10/2009 | White et al. | 705/26 |
| 2010/0041470 A1 * | 2/2010 | Preisach | 463/25 |
| 2010/0041482 A1 * | 2/2010 | Kumar et al. | 463/42 |
| 2010/0075729 A1 * | 3/2010 | Allen et al. | 463/7 |
| 2010/0094863 A1 * | 4/2010 | Kenton-Dau et al. | 707/722 |
| 2010/0100204 A1 * | 4/2010 | Ng et al. | 700/91 |
| 2010/0144428 A1 * | 6/2010 | Fontaine et al. | 463/28 |
| 2010/0256789 A1 * | 10/2010 | Miller | 700/91 |
| 2011/0035400 A1 * | 2/2011 | Nishida et al. | 707/769 |
| 2011/0098093 A1 * | 4/2011 | Amaitis et al. | 463/4 |
| 2011/0112891 A1 * | 5/2011 | Alber et al. | 705/7.42 |
| 2011/0184783 A1 * | 7/2011 | Roman Stoica et al. | 705/7.38 |
| 2011/0191138 A1 * | 8/2011 | Saraf | 705/7.28 |
| 2012/0009984 A1 * | 1/2012 | Amaitis et al. | 463/4 |
| 2012/0149472 A1 * | 6/2012 | Miller | 463/42 |

FOREIGN PATENT DOCUMENTS

| | | |
|---|---|---|
| WO | 9618162 A1 | 6/1996 |
| WO | 0008567 A1 | 2/2000 |
| WO | 0108063 A1 | 2/2001 |

OTHER PUBLICATIONS

Shin, H. "Measuring the Incidence of Insider Trading in a Market for State-Contingent Claims," The Economic Journal, Sep. 1993, pp. 1141-1153, vol. 103, No. 420, Royal Economic Society.

Shin, H., "Optimal Betting Odds Against Insider Traders," The Economic Journal, Sep. 1991, pp. 1179-1185, vol. 101, Issue 408, Royal Economic Society.

Smith,T.R., "A Statistical Model for Characterizing Price Variability with Application to Dairy Investment Analysis," 1980, pp. 1-2.

Smithson, C.W., Managing Financial Risk: A Guide to Derivative Products, Financial Engineering and Value Maximization, Third Edition, McGraw-Hill Professional, 1998, pp. 34-38, 270-271 and 305-306.

Takahiro, W., "A Parimutuel System with Two Horses and a Continuum of Bettors," Jounal of Mahematcal Economics 28, pp. 85-100, 1997.

University of Iowa's Iowa Electronic Market (IEM) Trader's Manual, Aug. 1995, pp. 1-51, via http://web.archive.org/web/19970506020832/www.biz.uiowa.edu/iem/trman.txt.

U.S. Appl. No. 60/389,956, filed Jun. 20, 2002, application, including specification and drawings.

U.S. Appl. No. 60/442,462, filed Jan. 25, 2003, application, including specification, claims and abstract.

Watanabe, T., et al., 1994, "A Model of a General Parimutuel System: Characterizations and Equilibrium Selection," International Journal of Game Theory 23, pp. 237-260.

Weigel, E., "SuperUnits and SuperShares," Interfaces, May-Jun. 1994, pp. 62-79, vol. 24, No. 3, The Institute of Management Sciences.

Williams, L., "Information Efficiency in Betting Markets: A Survey," Bulletin of Economic Research, 1999, pp. 1-30, vol. 51, No. 1, Blackwell Publishers, Malden, MA.

Ainslie, T., Ainslie's Complete Hoyle, 1975, Barnes and Noble Books by Simon and Schuster, Inc., p. 251.

Athanasoulis, S., et al., Macro Markets and Financial Security, FRBNY Economic Policy Review, Apr. 1999, pp. 21-39.

Bahra, B., "Implied Risk-Neutral Probability Density Functions From Option Prices: Theory and Application," Bank of England, 1997, ISSN 1368-5562.

Baron, K., et al., "From Horses to Hedging," Risk Magazine, Feb. 2003, pp. 73-77, vol. 16, No. 2, Risk Waters Group, Ltd., United Kingdom.

Billingsley, P., Probability and Measure, 1986, Second Edition, John Wiley and Sons, New York, pp. 16-26.

Bruce, A., et al., "Market Efficiency Analysis Requires a Sensitivity to Market Characteristics: Some Observations on a Recent Study of Betting Market Efficiency," Applied Economics Letters, 2000, pp. 199-202, No. 7, Taylor and Francis Ltd.

Bruce, A., et al., "Investigating the Roots of the Favourite-Longshot Bias: An Analysis of Decision Making by Supply-and Demand-Side Agents in Parallel Betting Markets," Journal of Behavioral Decision Making, 2000, pp. 413-430, vol. 13, Issue No. 4, John Wiley & Sons, Ltd.

Burns, G., "As the U. of Iowa Goes, So Goes the Nation?" Business Week, New York, Nov. 11, 1996, Issue 3501, p. 118.

Burns, G., "The Election Futures Market: More Accurate than Polls?" Nov. 11, 1996, Business Week, 1-3.

Busche, K., et al., "Decision Costs and Betting Market Efficiency," Rationality and Society, 2000, pp. 477-492, vol. 12, No. 4, Sage Publications, Thousand Oaks, CA.

Cain, M., et al., "The Relationship between Two Indicators of Insider Trading in British Racetrack Betting," Economica, 2001, pp. 97-104, No. 68, The London School of Economics and Political Science.

Cain, M., et al., "The Incidence of Insider Trading in Betting Markets and the Gabriel and Marsden Anomaly," The Manchester School, Mar. 2001, pp. 197-207, vol. 69, No. 2, Blackwell Publishers Ltd., Malden, MA.

Dek, T., et al., “Optimal Betting and Efficiency in Parimutuel Betting Markets with Information Costs,” The Economic Journal, Jul. 1996, pp. 846-863, vol. 106, No. 437, Blackwell Publishers, Malden, MA.
Economides, N. et al., “Electronic Call Market Trading,” The Journal of Portfolio Management, Spring 1995, pp. 10-18.
Edelman, D.C., et al., “Tote Arbitrage and Lock Opportunities in Racetrack Betting,” Working Paper, Oct. 17, 2001, pp. 1-8, Department of Accounting and Finance, University of Wollongong, Australia.
Eisenberg, E., “Consensus of Subjective Probabilities: The Pari-Mutuel Method,” Annals of Mathematical Statistics, Mar. 1959, pp. 165-168, vol. 30, No. 1, Institute of Mathematical Statistics.
Evans, M., et al., Statistical Distributions, Second Edition, John Wiley & Sons, Inc., New York, pp. 140-141, 1993.
Fingleton, J., et al., “Optimal Determination of Bookmakers’ Betting Odds: Theory and Tests,” Jun. 1, 2001, pp. 1-36, Technical Paper No. 96/9, Trinity College, Dublin, Ireland.
Garbade, K., et al., 1979, “Structural Organization of Secondary Markets: Clearing Frequency, Dealer Activity, and Liquidity Risk,” The Journal of Finance, vol. 34, No. 3, pp. 577-593.
Gu, S., et al., “Exchange Market Model for Over-the-Counter Equity Derivatives Trading,” Working Paper, Oct. 9, 2001, pp. 1-29, Center for Research on Electronic Commerce, The University of Texas at Austin.
Hakansson, N., “Welfare Aspects of Options and Supershares,” The Journal of Finance, Jun. 1978, pp. 759-776, vol. 33, No. 3.
Hanson, R., “Logarithmic Market Scoring Rules for Modular Combinatorial Information Aggregation,” Working Paper, Jan. 2002, pp. 1-12, Department of Economics, George Mason University.
Haug, E.G., The Complete Guide to Options Pricing Formulas, 1998, McGraw-Hill, N.Y. p. 1.
Hausch, D., et al., Efficiency of Racetrack Betting Markets, 1994, Academic Press Inc., San Diego, CA.
Helenius, T., “Real Bonds, Real-time, Real Fast,” Wall Street & Technology, New York, Apr. 1998, vol. 16, Issue 4, pp. 62-66.
Hong, S., “Japanese Investment Posts Strong Momentum,” China Daily, New York, NY, Feb. 15, 1997, pp. “3-1” to “3-2”.
Hurley, W.J., Winter 1998, “On the Use of Martingales in Monte Carlo Approaches to Multiperiod Parameter Uncertainty in Capital Investment Risk Analysis,” The Engineering Economist, vol. 43, No. 2, pp. 169-182.
Ingersoll, J., Jr., “Digital Contracts: Simple Tools for Pricing Complex Derivatives,” Journal of Business, 2000, pp. 67-88, vol. 73, No. 1, The University of Chicago, Chicago, IL.
Johnson, J., “An Empirical Study of the Impact of Complexity on Participation in Horserace Betting,” Journal of Gambling Studies, Summer 1997, pp. 159-172, vol. 13, No. 2, Human Sciences Press, Inc.
Karp, J., “River Runs Dry: Big Hongkong Property Deal Falls Through,” Far Eastern Economic Review, Hong Kong, Nov. 12, 1992, vol. 155, Issue 45, Starts on p. 69.
Lack of Debt Trades Stunts Market-HSBC, Businessworld, Manila, Sep. 22, 1998, pp. 1-2.
Lange, L., et al., “A Parimutuel Market Microstructure for Contingent Claims Trading,” Working Paper, Nov. 21, 2001, pp. 1-47, Stern School of Business, New York University, New York, NY.
Madhavan, A., “Trading Mechanisms in Securties Market,” The Jounal of Finance, 1992, vol. 47, No. 2, pp. 607-641.
Merton, R., “Continuous-Time Finance,” Basil Blackwell, Inc., 1990, Cambridge, Massachusetts, pp. 441-457.
Mintz, S.L., “Measuring up: What CEOs Look for in their Chief Financial Officers,” CFO, Boston, MA, Feb. 1994, vol. 10, Issue 2, pp. 28-32.
Narsing, A., et al., “Constrained Moments Simulation of Healthcare Capital Acquisitions,” IEEE, 1997, New York, NY, USA, Portland International Conference on Management of Engineering Technology, p. 768.
Owen, G., “Parimutuel as a System of Aggregation of Information,” Game Theoretical Applications to Economics and Operations Research, 1997, pp. 183-195, Kluwer Academic Publishers, The Netherlands.
Pagano, M. et al., Jun. 1996, “Transparency and Liquidty: A Comparison of Auction and Dealer Markets with Informed Trading,” The Journal of Finance, vol. 51, No. 2, pp. 579-611.
Parker, K., Derivatives Offer Opportunity for the Small-Time Trader, The Vancouver Sun, Vancouver, B.C.: Apr. 10, 1995, pp. 1-2.
Pedersen, C.S., “Derivatives and Downside Risk,” Derivatives Use, Trading & Regulation, 2001, pp. 251-268, vol. 7, No. 3, London.
Peel, D., et al., “Product Bundling and a Rule of Thumb versus the Harville Formulae: Can Each Way Bets with UK Bookmakers Generate Abnormal Returns,” Applied Economics, 2000, pp. 1737-1744. No. 32, Taylor & Francis Ltd.
Phatarfod, R., “Betting Strategies in Horse Races,” Asia-Pacific Journal of Operational Research, 1999, pp. 87-98, No. 16.
Plott, C.R., et al., “Parimutuel Betting Markets as Information Aggregation Devices: Experimental Results,” Caltech Social Science Working Paper 986, Apr. 1997, pp. 1-58.
Randhawa, S.U., et al., “Financial Risk Analysis Using Financial Risk Simulation Prog,” Industrial Management, Norcross, Sep./Oct. 1993, vol. 35, Issue 5, pp. 24-27.
Rhoda, K., et al., “Risk Preferences and Information Flows in Racetrack Betting Markets,” The Journal of Financial Research, Fall 1999, pp. 265-285, vol. 22, No. 3.
Rubinstein, M., “Supershares,” Handbook of Equity Derivatives, 1994, pp. 1-14, Irwin.
Saatcioglu, K., et al., “Design of a Financial Portal,” Communications of the ACM, Jun. 2001, pp. 33-38, vol. 44, No. 6.
Schnitzlein, C., “Call and Continuous Trading Mechanisms Under Asymmetric Information: An Experimental Investigation,” The Journal of Finance, Jun. 1996, vol. 51, No. 2, pp. 613-636.
Schwartz, R.A., “Integrating Call and Continuous Markets,” Securities Traders’ Monthly, Sep. 1991, pp. 14-16.
Shapley, L., et al., 1977, Trade Using One Commodity as a Means of Payment, Journal of Political Economy, vol. 85, No. 1, pp. 937-968.

* cited by examiner

9

| Horse Number | Category 1 (Score value) | Category 2 (Score value) | Category 3 (Score value) | Overall Score Value |
|---|---|---|---|---|
| 1 | 7 | 5 | 1 | 13 |
| 2 | 6 | 7 | 2 | 15 |
| 3 | 0 | 2 | 0 | 2 |
| 4 | 0 | 0 | 0 | 0 |
| 5 | 3 | 0 | 8 | 11 |
| 6 | 5 | 6 | 3 | 14 |
| 7 | 1 | 5 | 4 | 10 |
| 8 | 0 | 9 | 8 | 17 |

Fig. 4

| Horse | Muddy Track Score | Last Six Score | Speed Score | Overall Score |
|---|---|---|---|---|
| 1. 3 Affirmed | 7 | 8 | 6 | 21 |
| 2. 4 Assault | 5 | 7 | 4 | 16 |
| 3. 1 Secretariat | 5 | 7 | 2 | 14 |
| 4. 5 Count Fleet | 4 | 3 | 0 | 7 |
| 5. 6 Whirlaway | 2 | 0 | 0 | 2 |
| 6. 2 Citation | 1 | 0 | 0 | 1 |

PREDICTING OUTCOMES OF FUTURE SPORTS EVENTS BASED ON USER-SELECTED INPUTS

FIELD OF THE INVENTION

The present invention relates to a method and a system for predicting the outcomes of future sports events based on user-selected inputs. The user-selected inputs relate to past performance statistics recorded in connection with past events similar to the sports event to be predicted, organized into certain pre-defined categories and translated into a proprietary scoring system.

BACKGROUND INFORMATION

Sports events are often studied in great detail and statistics concerning the events may be computed and stored for subsequent use, such as for a later event featuring a similar set of circumstances. For example, during a baseball game, a sportscaster may draw attention to the past performance of individual players or a team as a whole, including how the player/team performed previously against the same opponent or in the same venue. The statistics can be divided into any number of categories, which may be specific to a type of sports event (e.g., batting average is specific to baseball). While the statistics may or may not have direct relevance to the outcome of a subsequent event, they may nonetheless hold perceived significance to event followers, who rely on the statistics for predicting future performance.

In sports wagering, statistics information may be provided by an event organizer, a betting operator or a record keeping entity. However, the information is presented in a form that is inconvenient or hard to interpret. For example, FIG. 1 shows an excerpt from a racetrack program for horse racing, commonly available at racetracks, newspaper stands and on the Internet. The racetrack program is complex, contains a lot of information, and may be confusing to a significant portion of race followers (including racetrack customers and non-customers alike). In fact, the racetrack program of FIG. 1 is likely too sophisticated for all but a professional gambler. Therefore, casual bettors and occasional racetrack visitors may be intimidated by the form in which the information is presented, and as a result may simply ignore the racetrack program in making betting decisions.

BRIEF DESCRIPTION OF THE DRAWINGS

FIG. 4 is a table that shows a list of score values used to generate a predicted outcome according to an example embodiment of the present invention.

SUMMARY

Figure 1:
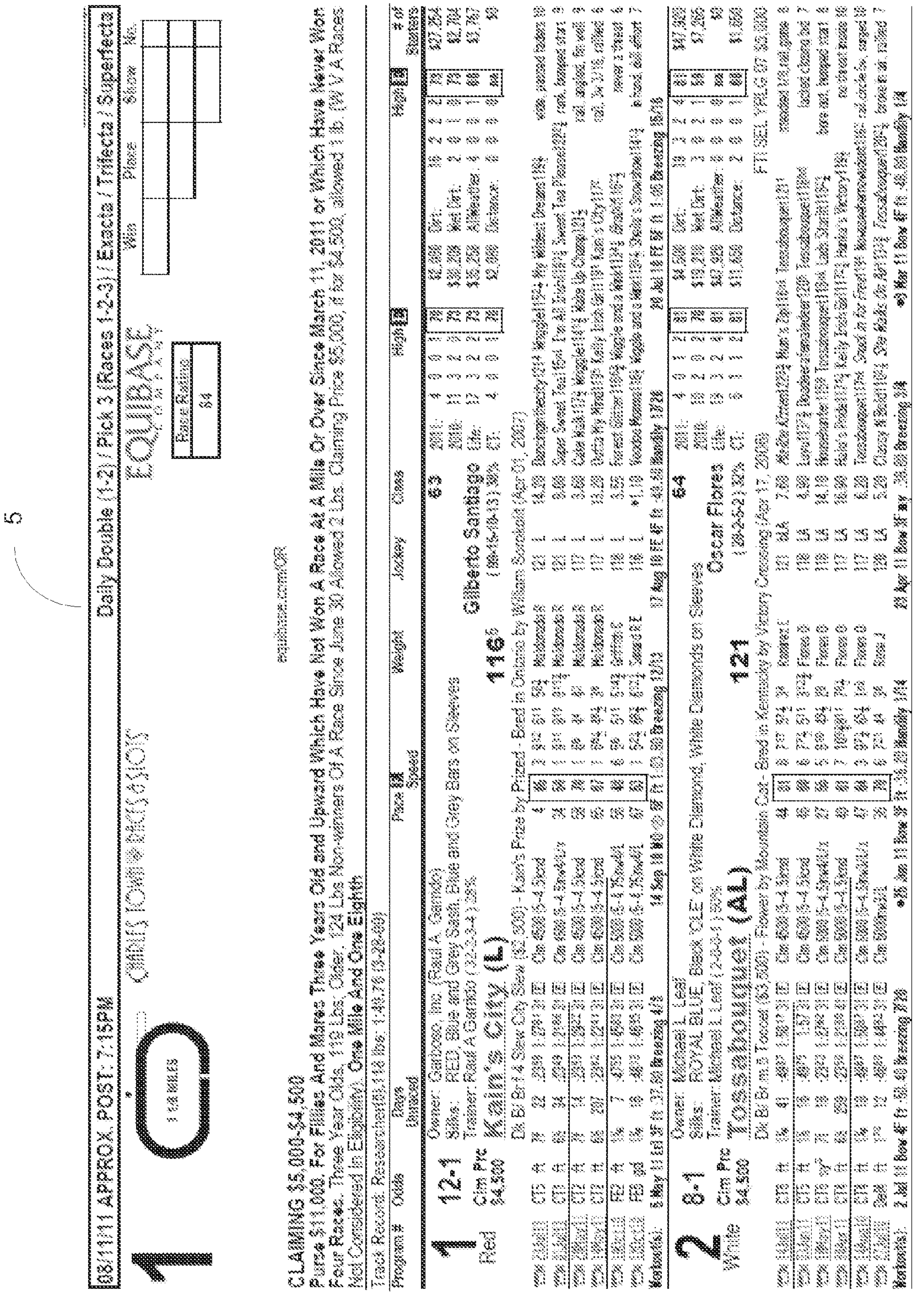
Fig. 1 (Prior Art)
FIG. 1 is an excerpt from a conventional racetrack program.

Example embodiments of the present invention provide a system and method for presenting statistics information in an easily understandable manner, as well as for processing such information on behalf of users, to create a predicted outcome of a sports event.

Example embodiments of the present invention relate to methods and corresponding device(s) for predicting outcomes of sports events based on user-selected inputs, or categories. In a preferred embodiment, the categories are used to calculate and display a predicted order of finishers of a race, e.g., horses, in a particular race. The predicted order is then displayed in a simple, user-friendly and engaging manner. In an example embodiment, the prediction may be performed by a processor of a computing device, e.g., of a mobile computing device, in response to a set of stored instructions that form a user interface that receives user identifications of at least one category. The processor executes a set of instructions to generate the predicted outcome by applying a prediction algorithm to the identified at least one category. The statistics information relied upon by the prediction algorithm may be at least partially hidden from the user.

According to example embodiments, the user interface allows the user to identify the at least one category via a drag-and-drop action in which each individual category is identified by dragging its corresponding graphical icon into a designated collection area.

According to example embodiments, the user interface allows the user to select from a list of events for which the outcome has yet to be determined. The list may be updated periodically or upon user demand.

According to example embodiments, the predicted outcome is a list of racers, e.g., race horses, sorted according to predicted order of finish.

According to example embodiments, the prediction algorithm determines, for an event participant, e.g., a race horse, a proprietary score value for each identified category, based on pre-defined formulae that convert industry recognized statistical information concerning the identified category into proprietary scoring values utilizing a proprietary, rules-based, translation algorithm.

According to example embodiments, at least one additional user-identifiable category is unrelated to statistics information.

According to example embodiments, the prediction algorithm assigns an overall score to each participant as a function of the participant's category score values, and the predicted outcome is displayed as a list ordered according to overall score.

According to example embodiments, when a plurality of categories are identified, the user interface identifies to the user the event participant with the highest score within each identified category.

According to example embodiments, the user interface provides the user with an option to display the category score values of each user-selected category of each event participant included in the predicted outcome.

According to example embodiments, the user interface provides the user with an option to adjust a degree to which an identified category's score value contributes to the overall score. The adjustment is performed by increasing or decreasing a weight value assigned to a particular category.

According to example embodiments, weights are adjusted by allowing categories to be identified more than once.

According to example embodiments, the user interface provides the user with an option to place a wager on an event participant included in the predicted outcome.

DETAILED DESCRIPTION

System Overview

Figure 2:
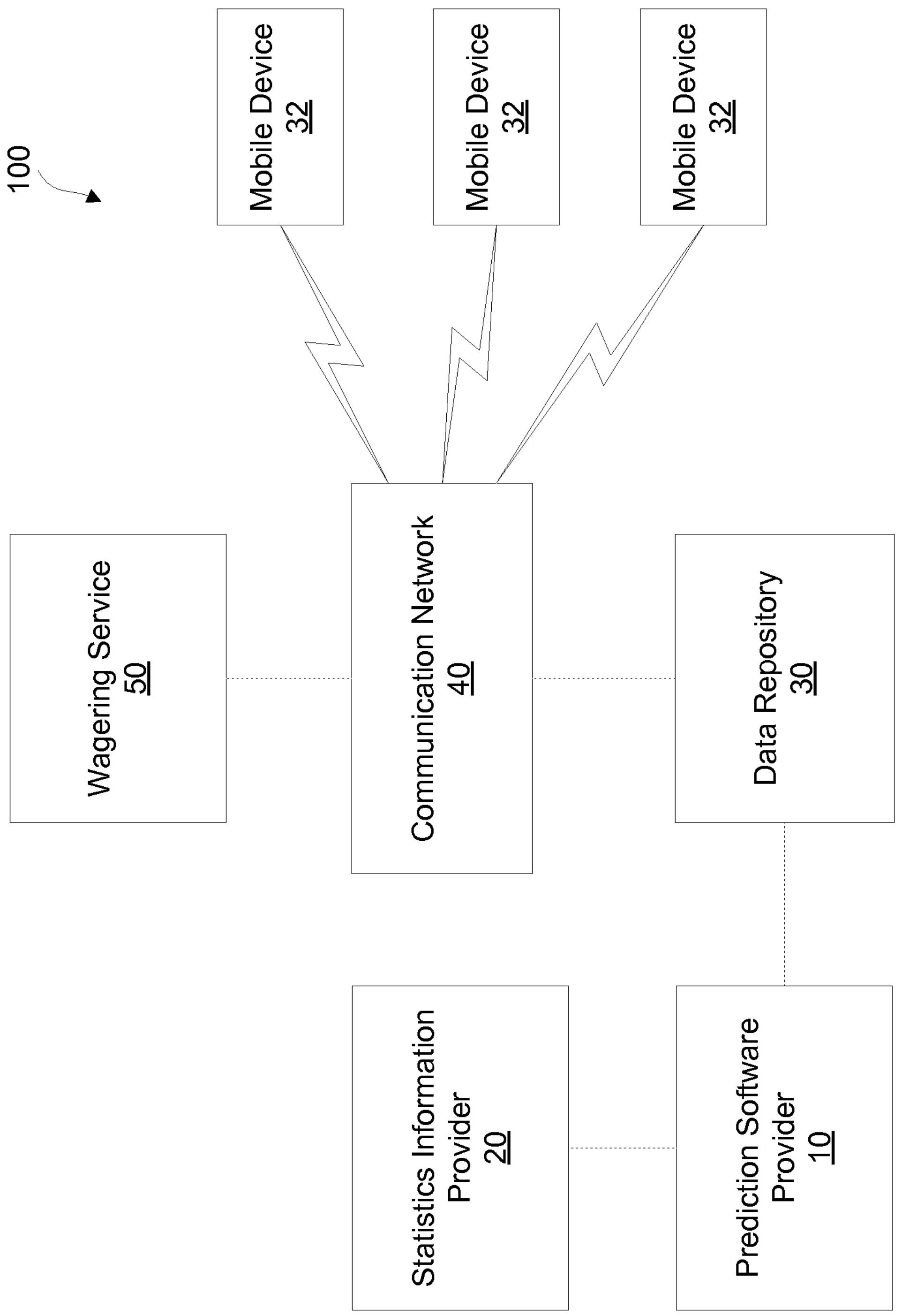
FIG. 2 is a block diagram of a system for predicting outcomes of sports events according to an example embodiment of the present invention.

FIG. 2 shows an example system 100 for predicting outcomes of sports events according to the present invention. The system 100 may include a provider 10 of a prediction software, a provider 20 of statistics information, a data repository 30, a plurality of mobile devices 32, a communication network 40 and a wagering service 50.

The software provider 10 may be a software developer that provides access via the mobile devices 32 to a software module that implements a prediction algorithm according to an example embodiment of the present invention. The software provider 10 may obtain, from the information provider 20, statistics information concerning an event to be predicted. The information may be obtained in an electronic or a machine-readable format, e.g., as an Excel or XML file downloaded via the Internet. Alternatively, the information may be obtained in print format, e.g., a printed racetrack program. After obtaining the information, the software provider 10 may separate the information into one or more categories. In some instances, the information may have already been categorized by the information provider 20. After being categorized, the information may be stored in a database, e.g., a local server at the software provider's location or a remote storage location such as the data repository 30.

The software provider 10 may specify a set of rules or criteria by which the prediction algorithm determines a rank of each participant in a sports event to be predicted using the algorithm. As will be explained below, the algorithm may determine the ranks by calculating an overall score of each participant. Further, the overall score may be a function of one or more score values, each of which is assigned to a separate category. The prediction algorithm is explained in further detail in the PREDICTION METHODS section below.

The software module containing the prediction algorithm may form a first component of a software program provided to users of the mobile devices 32 for installation thereon. A second component of the program may be a user interface, whereby the users are provided with the option to identify one or more categories that they feel are relevant to predicting the outcome of a sports event. The user interface is explained in further detail in the USER INTERFACE section below.

For example, the software program may be transferred to the data repository 30 for storage and for subsequent transmission to the mobile devices 32. The repository 30 may be publically accessible. In an example embodiment, the repository 30 may be operated under the control of the software provider 10. In another example embodiment, the repository 30 may be operated by a third party, e.g., the program can be an application program ("app") downloadable from Apple Corporation's iTunes Store or from an Android-OS-based store.

The software provider 10 may choose whether to provide access to the program for a fee. In an example embodiment, the program may initially be downloaded to the mobile devices 32 for free. Thereafter, the user may be required to pay fees for using the program. For example, the user may pay on a per-event basis (e.g., a single race or a race card), a per-use basis (e.g., each prediction involves a fee), or a subscription basis (e.g., daily, monthly or yearly subscriptions). One example of a per-race card fee is to charge the user a fixed amount in exchange for unlimited predictions based on the entire set of races for a given day at a particular racetrack.

In an example embodiment, the software provider 10 may enter into a partnership with the information provider 20 (e.g., a revenue sharing arrangement, co-branding, or a partner distribution agreement). In this manner, the software provider 10 may obtain the information at a reduced cost and, consequently, may charge a lower fee to the user for access to the software.

The mobile devices 32 may each include a processor-equipped computing device, such as a smartphone, iPad or other tablet device, a personal digital assistant (PDA), a laptop, etc. Each device 32 may include at least one computer processor that executes the software program. The devices 32 may be in communication with the repository 30 and/or the wagering service 50 via the communication network 40. In an example embodiment, the network 40 includes the Internet and the devices 32 may download the program from the repository 30 and install the program. In another example embodiment, the program may be provided to the users on a portable hardware computer-readable storage medium (e.g., a memory card) and the program is installed via the portable storage medium, e.g., copied onto another storage medium in the device 32. Prior to and/or after installation of the program, the users may be required to communicate with the repository 30 in order to make predictions using the program (e.g., required to establish a user account, establish a fee payment arrangement, obtain a software license, etc.).

The wagering service 50 may be a provider of advance deposit wagering (ADW), in which the users can place wagers on horse races, using money from a user funded account. Alternatively, the wagering service 50 may be an individual racetrack operator, a book-maker, or a casino operator. Other wagering services also exist, both in horse-racing and other sports. In an example embodiment, the software provider 10 may enter into an agreement with the wagering service 10, whereby bets can be transmitted to the wagering service 50 using the program.

Prediction Methods

Methods relating to predicting the outcome of sports events will now be described according to example embodiments of the present invention. The methods may be implemented by the software program described above and performed on the devices 32. The various methods described herein may be practiced, each alone, or in various combinations.

Figure 3:
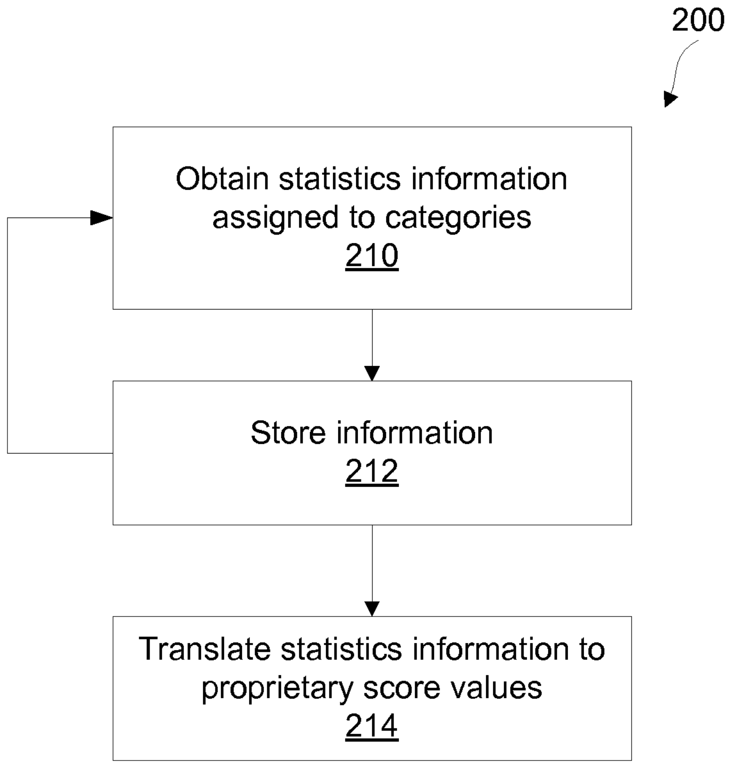
FIG. 3 is a flowchart that shows a method for providing for implementation of a prediction algorithm that predicts outcomes of sports events according to an example embodiment of the present invention.

FIG. 3 is a flowchart that shows a method 200 for providing for implementation of a prediction algorithm that predicts outcomes of sports events, according to an example embodiment of the present invention. At step 210, statistics information is obtained from the information provider 20. The information may be received organized according to predetermined information categories. Alternatively, once received, the information may be divided into predefined categories. Any number of categories are possible. In an example embodiment, the recognition of the categories to which the information belongs may be manual, e.g., by a programmer. Alternatively, a processor may automatically determine the categories to which the various received information belongs based on predetermined fields, a predetermined format, and/or predetermined metadata used by the information source(s).

At step 212, the received information may be stored in a database organized according to the information categories. At step 214, the received information is translated into a proprietary score value, based on pre-defined formulae that convert industry recognized statistical information concerning the identified category into proprietary scoring values utilizing a proprietary, rules-based, translation algorithm. Each score may be a numeric value of 0, 1, 2, 3, 4, 5, 6, 7, 8, 9, or 10. 0 will be the lowest or weakest score, and 10 will be the highest or strongest score. Each score will represent a measure of how strong (or weak) a participant performs in a particular category. One skilled in the art of sports handicapping would be able to develop the specific rules for the translation algorithm. A programmer may program the scoring rules. The rules may differ between different types of sporting events. For example, different information may be relevant for different types of sporting events and different types of outcome scenarios may be associated with different types of events. For example, whether a court is clay or grass may be relevant to a tennis match but not be relevant to other sporting events.

An example of a horse-racing category may be "Muddy Track." This category relates to a horse's past performance in off track conditions (such as slop and muddy track conditions). For example, if the horse finished in the top three places in its last three outings in off track conditions, then the translation algorithm would assign that horse a very high score value, such as a 10 or a 9 in the Muddy Track category. As another example, if that horse finished in the top three places in only one of its last three outings in off track conditions, the translation algorithm might assign that horse a 7 in the Muddy Track category.

Once translated, each score will be recorded in a table of values. A separate table may be stored for each sporting event. The tables may then be further customized according to user selections to present an overall score based on the scores of a subset of the categories. Additionally, the data repository 30 may continue to be updated with information, e.g., pertaining to new events or updates concerning an event on which bets were previously placed, e.g., new injuries or player substitutions.

Other example categories for horse-racing include: a horse's lifetime record (e.g., win percentage, percentage in-the-money-first, second or third place finishes), a horse's current year record, a horse's lifetime earnings, a horse's current year earnings, track condition, a jockey's win percentage (e.g., in the current year or the last two years), morning line odds (e.g., ranked in order from lowest to highest), Triple Crown breeding (e.g., whether the horse was bred by a Triple Crown winner), and horse speed (e.g., an industry-recognized speed figure score).

An additional set of identifiable categories may be presented for the benefit of advanced users, who may be experienced with using and interpreting statistics relating to those advanced categories. Basic users may elect to have the software program not present the advanced categories as identifiable categories. Example advanced categories in horse-racing include: a horse's record at the distance, a horse's record at the same track, a horse's last two year's earnings at the track, a horse's last two years earnings at the distance, change in medication/equipment, a layoff duration (e.g., the duration of a horse's most recent layoff), trainer lifetime win percentage, trainer current year win percentage, and time at distance. In other example embodiments, those categories which are considered basic and those categories which are considered advanced may be different than as described above.

Additionally, categories unrelated to any statistics information (e.g., not tied to a participant's prior performance) may be made identifiable for entertainment purposes. These "fun" categories may be used to add a sense of randomness and entertainment to the prediction. For example, one such category may include "Favorite ice cream," whereby each participant in the sports event has associated with it a favorite flavor of ice cream, which is either randomly assigned or assigned based on actual preferences of the participant (for example, Jose Reyes prefers vanilla ice cream). The user is presented with a list of popular ice cream flavors and selects the user's favorite ice cream from the list. Those players, e.g., baseball players, tennis players, horse race jockeys, etc. who share the same preference may be scored higher. Unlike the scoring previously described, the score assignment for fun categories may be completely arbitrary or determined at random, and is solely for entertainment purposes.

The prediction algorithm (which applies the score values to generate a predicted outcome) is made available to the users, e.g., as a software program downloadable from the repository 30 to any device 32.

Aside from updates to the information, the software program itself may be updated to include algorithms for generating predictions for new types of sports events. The software program may be updated in response to a user input that indicates when the updating should occur. For example, the software may be updated on-demand, or transmitted to the user's device in accordance with the user's specified preferences. In an example embodiment, the software may be configured to check for new updates each time the software is executed or according to another predefined scheme.

In an example embodiment, each time the user interacts with the user interface to obtain event predictions, the local application may access the network 40 to obtain the relevant information from the data repository 30 to process the information to provide the prediction. In an example embodiment, the program installed on the mobile devices 32 may perform the interface functions, while the information processing to provide a prediction is performed at a server, e.g., at which the data repository 30 is located, in accordance with preferences and/or information entered by the user at the mobile device 32.

In an example embodiment of the present invention, the mobile device 32, e.g., executing the software installed thereon, may provide general information to a user concerning available betting events. As noted above, the software need not be limited to predicting one type of sport, but may include prediction algorithms for a variety of sports. However, the user might not be interested in all types of sporting events. For example, the user may be interested in predictions concerning only baseball, basketball, and horse-racing events. Accordingly, in an example embodiment of the present invention, the software may be user configured to check for updates concerning only, for example, new baseball, basketball and horse-racing events. The user may further configure the software to check for updates relating to specific venues (e.g., a particular racetrack or sports arena). After the relevant updates are received at the device 32, the user may then specify any one of the new events for prediction.

Updating may include the transfer of basic information regarding when the event is to occur, who the participants are, and what the stated odds are for each participant. In an example embodiment, updating may further include the transfer of a list of category score values, which are determined based on the latest available statistics information. Referring to FIG. 4, a table 9 includes score values for a group of horses across three different categories. Additionally, the table 9 may include an overall score for each horse, calculated as a function of the respective category score values of the horse. The overall scores may be calculated locally by the prediction algorithm based on the category score values. (Alternatively, the calculations may be performed at a central server, as noted above.)

Figure 5:
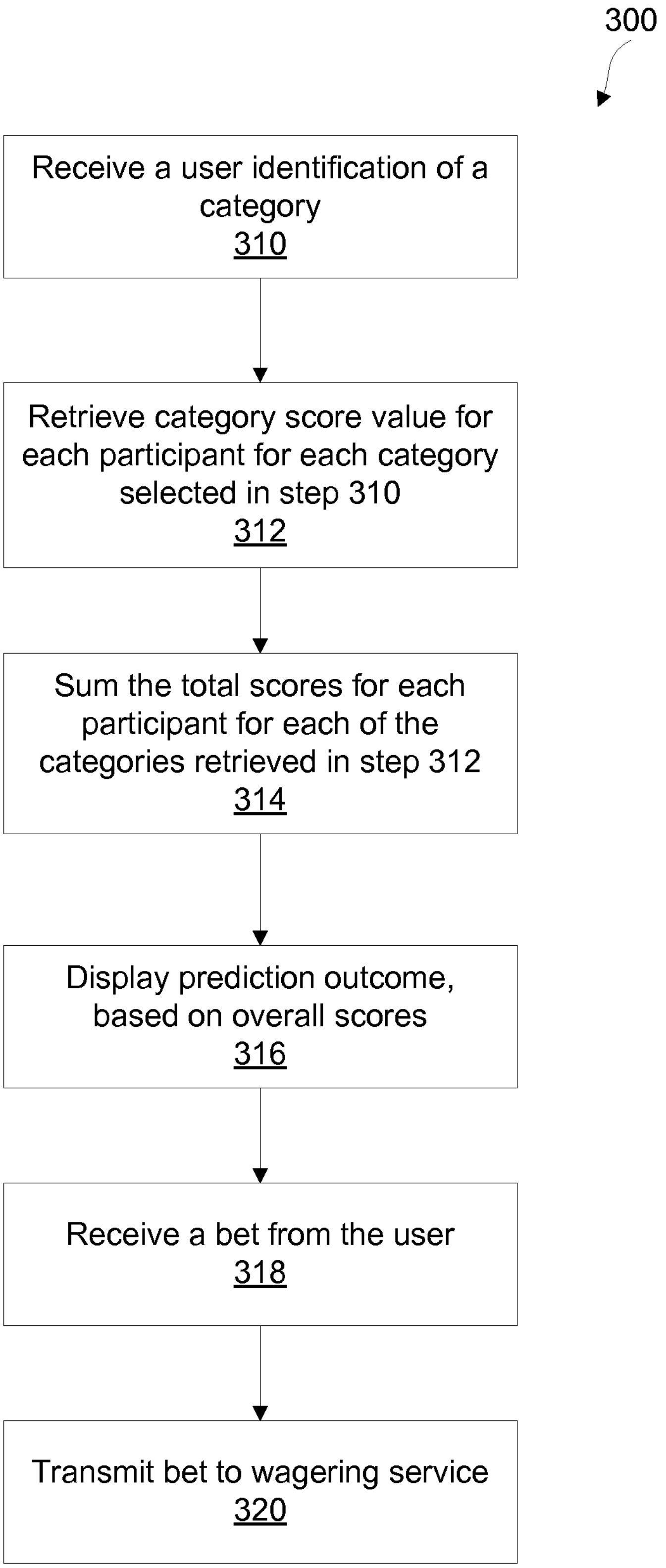
FIG. 5 is a flowchart that shows a prediction and betting method pertaining to a sports event according to an example embodiment of the present invention.

FIG. 5 is a flowchart that shows a method 300 for predicting an outcome of a sports event according to an example embodiment of the present invention. At step 310, a user identification of a category is received, e.g., by the software program by user input at the device 32. The software program may present the user with a list of categories from which the user selects the categories to identify.

At step 312, a score value is retrieved for each participant for each defined category selected by the user in step 310. The score is determined by the translation software referencing the statistics information previously transferred into the device 32. In an example embodiment, the score values are determined by having the at least one processor perform a lookup from a table such as the table 9 in FIG. 4.

At step 314, the overall score is calculated for each participant as a function of the category score values of each user identified category that was retrieved in step 312. In an example embodiment, each identified category is, by default, weighted equally in calculating the overall score. The specific formula for calculating the overall score may vary. In an example embodiment, the overall score is simply the sum of all the score values for all of the categories selected by the user, i.e., each category is weighted by a factor of one. In another example embodiment, the overall score is a weighted sum where, prior to a weight adjustment by the user, all weights are equal, e.g., if there are two identified categories, the overall score is 2*((0.5*Category1)+(0.5*Category2)).

The software program may provide the user with an option to adjust the weights of each category. If the user believes that a certain category has a greater relevance to the predicted outcome, then the user may adjust the weight of that category, e.g., increasing the weight of Category2 in the example above from 0.5 to 0.75. When the user adjusts the weight of any particular category, the program may automatically adjust the relative weights of the remaining identified categories accordingly so that the sum of all weights equals one. For example, increasing Category2 to 0.75 would require decreasing Category1 to 0.25.

At step 316, the predicted outcome is displayed based on the overall scores of the participants in the user-selected categories. The predicted outcome may include a list of participants ranked according to overall score, e.g., highest score first. The list may include all participants or a subset of participants, e.g., the top six scoring participants.

As step 318, a bet is received from the user. The bet may identify one or more participants included in the predicted outcome (e.g., a trifecta wager), along with a corresponding wager value.

At step 320, the bet is transmitted to a wagering service, e.g., the wagering service.

The bet is recorded by the wagering service and processed after the actual outcome of the event is determined.

User Interface

Exemplary embodiments of user interfaces related to predicting the outcome of sports events will now be described. The example user interfaces may be implemented by the software program described above and performed on the devices 32.

Figure 6:
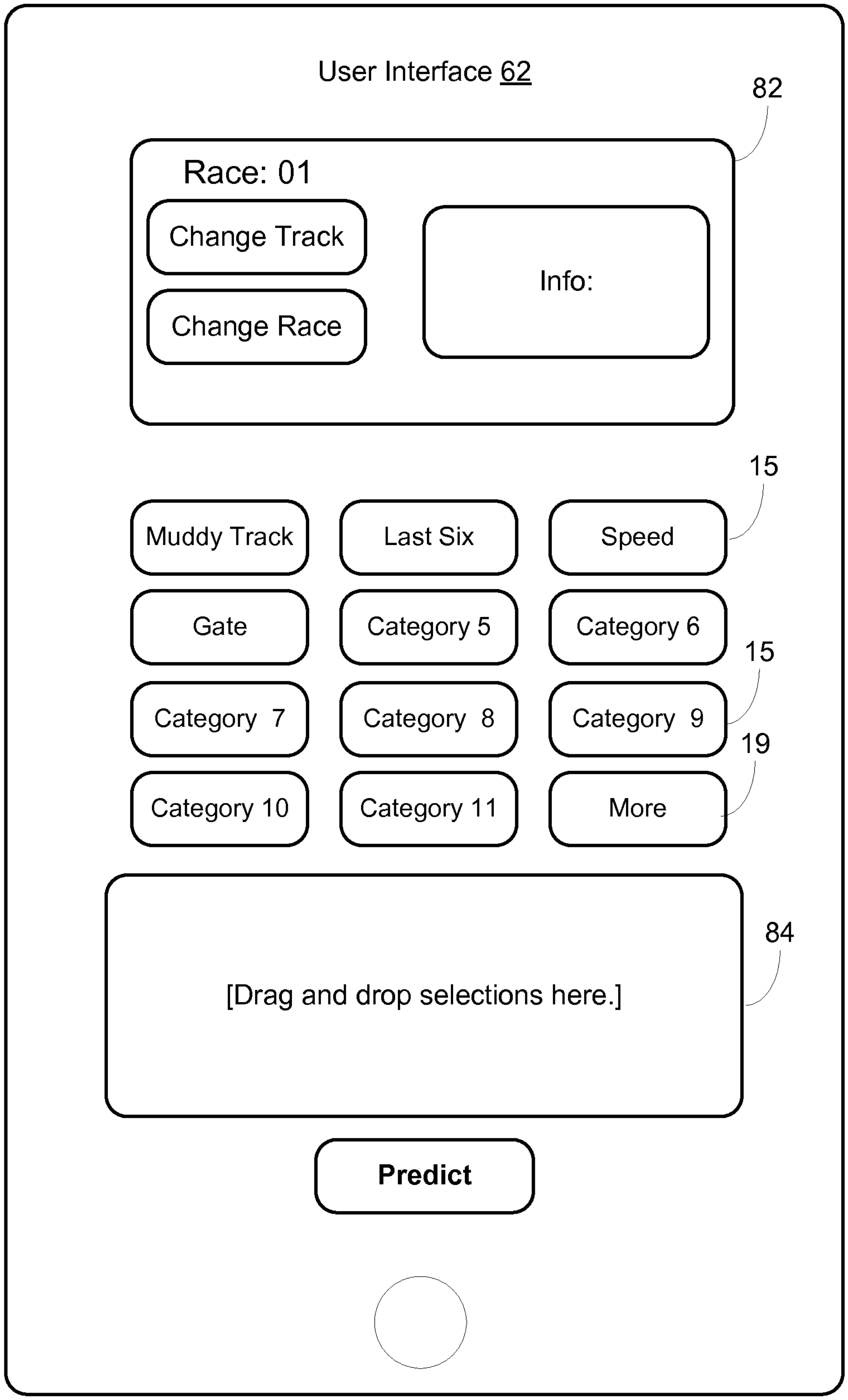
FIG. 6 shows a first graphical user interface of a sports event prediction application according to an example embodiment of the present invention.

FIG. 6 shows a graphical user interface 62 for predicting an outcome of a sports event according to an example embodiment of the present invention. The interface 62 may include an area 82 displaying basic information about a user selected sports event, e.g., race number and a list of horses participating in the race. The area 82 may also include options allowing the user to select a different event, such as another race or racetrack.

Figure 8:
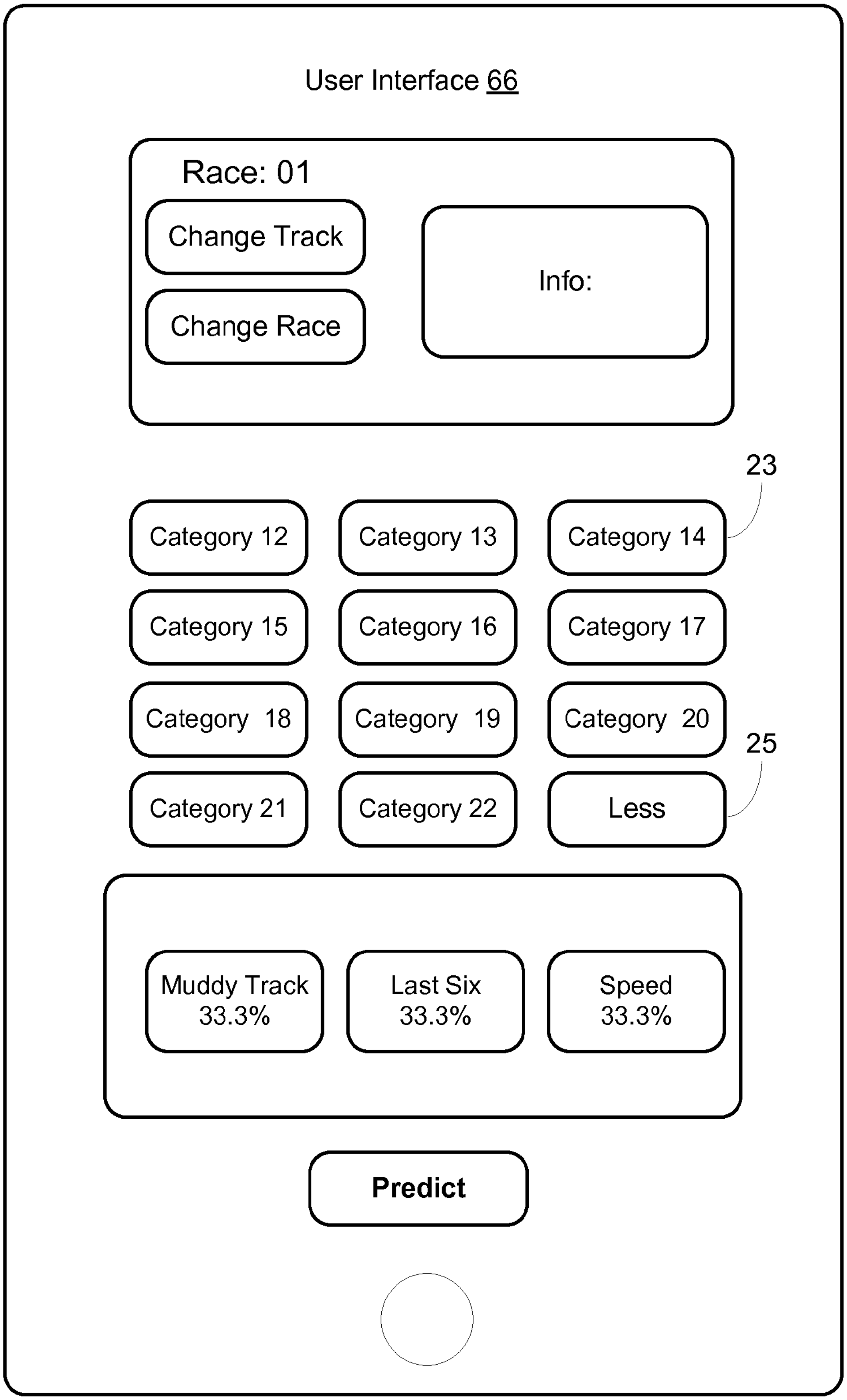
FIG. 8 shows a third graphical user interface of a sports event prediction application according to an example embodiment of the present invention.

The interface 62 may also include at least one area 15 corresponding to an identifiable category. In the horse-racing example, the categories may include muddy track condition, performance during a horse's last six outings, and a speed score. If the identifiable categories are too numerous to display on single display area, the interface 62 may provide an option to switch between display of a first set of identifiable categories and a second set of identifiable categories, e.g., activating a "More" option 19 may trigger a switch to displaying the user interface 66 of FIG. 8, which includes a second set of identifiable categories 23 and a "Less" option 25 that triggers a return to displaying the interface 62. In an alternative embodiment, the user can scroll-down to see additional categories below the fold.

The interface 62 may provide for identification of categories by drag-and-drop action. Alternatively, a click-and-drop or double-click-and-drop action may be used. In this regard, an area 84 may be reserved for the purpose of receiving dropped categories. The area 82 may include an "Info" section that displays a brief explanation of a category whenever that category is identified, or when the user highlights or hovers over the area 15.

Figure 7:
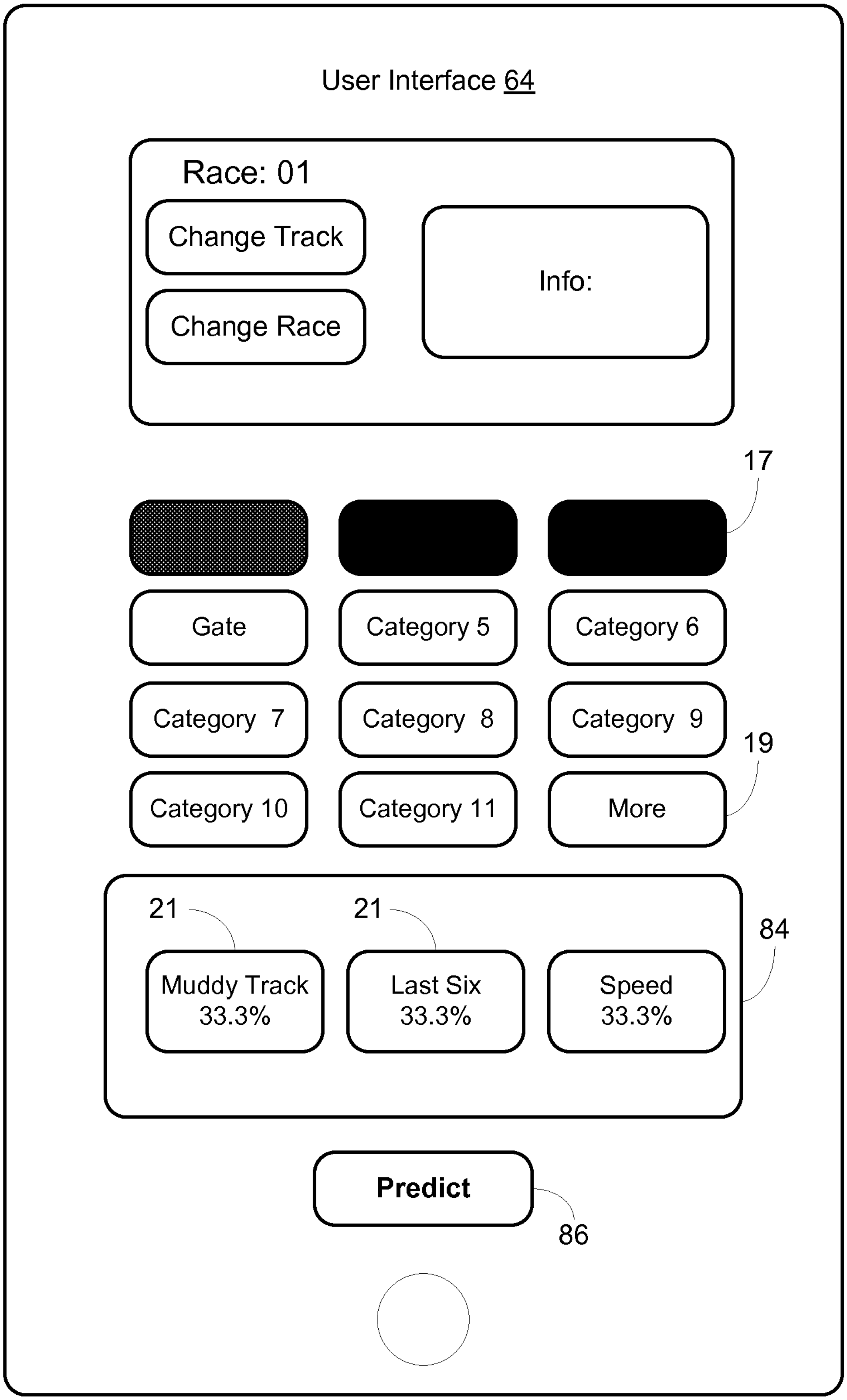
FIG. 7 shows a second graphical user interface of a of a sports event prediction application according to an example embodiment of the present invention.

FIG. 7 shows a graphical user interface 64 for providing a prediction of an outcome of a sports event according to an example embodiment of the present invention. The software program may transition from displaying the interface 62 to the interface 64 in response to user identification of a category. As show in FIG. 7, the user has identified muddy track, last six, and speed, each of which are displayed as separate graphical icons 21 in the area 84. Areas 17 correspond to the original locations of the icons prior to being dropped into the area 84. The areas 17 may be marked, e.g., shaded or highlighted, to indicate that the categories associated with the areas 17 have been successfully identified.

The interface 64 may include an area 86 that is activated by a user input to trigger execution of the prediction algorithm. In the example of FIG. 7, the prediction algorithm may compute the overall score of each horse based on a weighted sum of the horse's muddy track performance, performance in its last six outings, and its speed score. Since three categories have been selected, each category may be assigned a default weight of 33.3%. If the user desires for mud to be accorded a higher weight, then the user may re-identify the muddy track category, e.g., by dragging another instance of the muddy track icon from its area 17 to the area 84. Thus, if two instances of muddy track were identified, then the weight allocation could be: Muddy Track 50%, Last Six 25% and Speed 25%.

Figure 9:
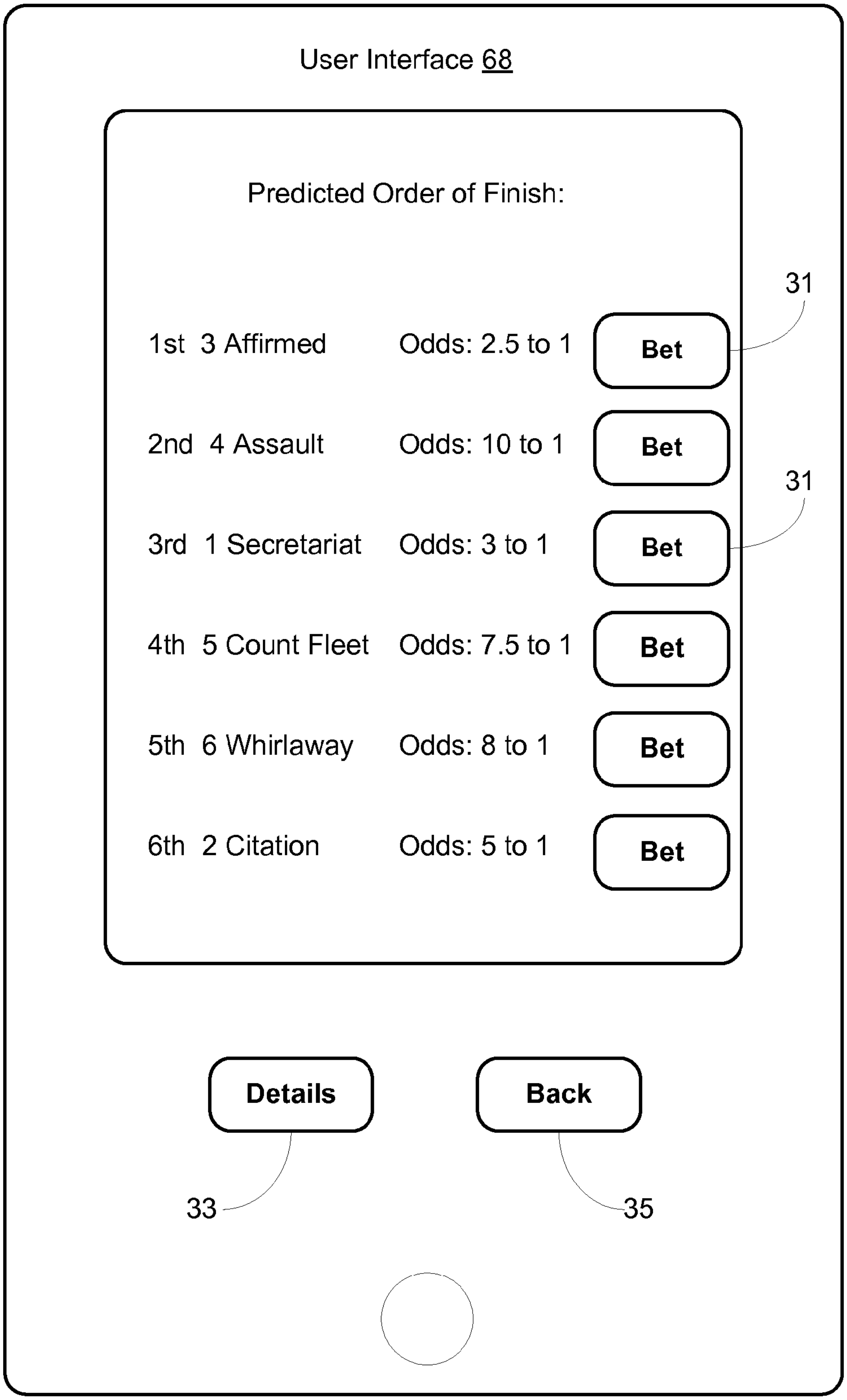
FIG. 9 shows a fourth graphical user interface of a sports event prediction application according to an example embodiment of the present invention.

FIG. 9 shows a graphical user interface 68 for presenting a predicted outcome of a sports event according to an example embodiment of the present invention. The interface 68 displays the predicted outcome, in this instance a predicted order of finish. The participants may be displayed in order of overall score. Additionally, an odds value, e.g., calculated based on parimutuel wagers, may also be displayed.

The interface 68 may include areas 31 that, when activated, allow the user to input a bet on a corresponding horse.

Figure 10:
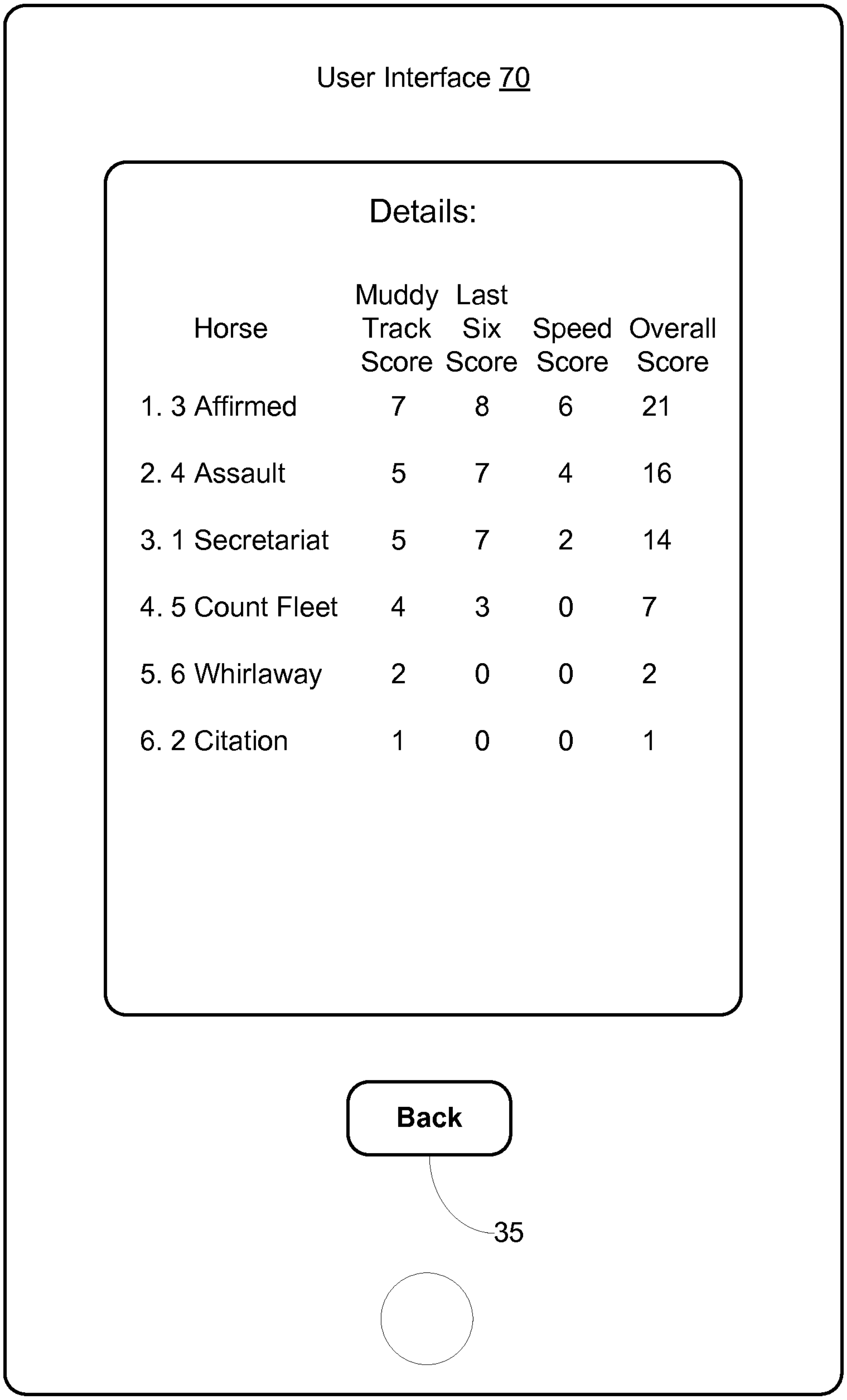
FIG. 10 shows a fifth graphical user interface of a sports event prediction application according to an example embodiment of the present invention.

More sophisticated or more familiar users may be interested in seeing the rationale for arriving at the predicted order of finish. They might want to see the degree of difference between the predicted first and second place finishers. They might be curious for other reasons. Accordingly, the interface 68 may also include an area 33 that is activated to display details relating to how the overall scores were calculated. For example, the software may switch to displaying the user interface 70 of FIG. 10 in response to user activation of the area 33. The interface 70 may also identify the participant(s) with the highest score value within each identified category (e.g., by highlighting or marking the highest score values). Lastly, the interfaces 68 and 70 may each include an option 35 to return to displaying a previous interface, e.g., returning to interface 66 from interface 68.

Referring again to FIG. 9, the figure illustrates areas 31, which represent soft buttons that are user-selectable for placing a bet on a corresponding event outcome. Specifically, in the example shown, the example outcome on which a bet is placeable by selection of one of the soft buttons is that a particular listed horse would win. Alternatively, the soft button is selectable for placing a bet that the particular listed horse will finish in the place indicated by the predicted order of finish. In an example embodiment of the present invention, a further option may be presented to allow a user to place a more advanced bet type in a manner that is tied to the output prediction. For example, an additional soft button, e.g., labeled "advanced," may be displayed. In response to selection of the button, the system may navigate to another user interface for placement of a bet of such advanced bet types. For example, in response to selection of the "advanced" button, the system may navigate to a page which lists a plurality of advanced bet types. Responsive to selection of one of the listed bet types, the system may present a page with a "bet" soft button for placement of an advanced bet type. For example, the user may select "trifecta" and the system may display the predicted order to finish with a single "bet" button, in response to which selection a bet may be placed on the first three listed horses to finish in the listed order. The repeated listing of the horses ordered according to the prediction may be provided to remind the user of the order immediately prior to placing the bet. In an alternative example embodiment, in response to selecting the "trifecta" button, the system may proceed to perform the algorithm for placing the bet on the trifecta since the predicted order of finish had already been placed.

In an example embodiment of the present invention, in response to selection of a "bet" button, the system may navigate to a bet placing page in which the user is able to enter additional information concerning the bet to placed, e.g., a wager amount and/or limit odds. In an example embodiment of the present invention, fields indicating the outcome on which the bet is being placed may be automatically populated according to the outcome corresponding to the selected "bet" button. In an example embodiment of the present invention, those fields may be user-modifiable. For example, the system may automatically populate the fields, and then the user can enter a change. For example, the user may initially select the "bet" button for a superfecta bet, where the bet is automatically prepared with the first four horses of the predicted order, and the user can then change one or more of the listed horses of one or more corresponding finish positions.

While the user interfaces have been described with respect to horse racing, user interfaces may be similarly provided for other sports. For example, in a two team or player sport, the system may indicate a predicted winner, on which a user may place a bet.

An example embodiment of the present invention is directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to a hardware computer-readable medium, e.g., as described above, having stored thereon instructions executable by a processor to perform the methods described herein.

An example embodiment of the present invention is directed to a method, e.g., of a hardware component or machine, of transmitting instructions executable by a processor to perform the methods described herein.

Example embodiments of the present invention are directed to one or more of the above-described methods, e.g., computer-implemented methods, alone or in combination.

Example embodiments of the present invention are directed to calculating an overall score based on category score values having equal weights by default. In another embodiment, the default weights may be unequal. For example, unequal weights may be assigned based on statistics information that indicate which categories are more correlated with actual outcomes (e.g., higher weights for more highly correlated categories).

In another example embodiment, a user interface may provide a "Pro's Picks" option that enables users to, as an alternative to identifying their own categories, choose a preselected category and/or weighting combination, as selected by a professional or "guest" handicapper. This can be a free service or can require an additional subscription. "Pros" could earn success ratings based on how accurately their category or weighting selections reflect actual performance. Such a service might allow neophytes to clear the initial learning hurdle, since navigating the range of categories and properly assigning weightings may present a steep learning curve for the newcomer.

The above description is intended to be illustrative, and not restrictive. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and appendices. Further, steps illustrated in the flowcharts may be omitted and/or certain step sequences may be altered, and, in certain instances multiple illustrated steps may be simultaneously performed.

What is claimed is:

1. A device for predicting an outcome of an event involving a plurality of participants, comprising:
at least one computer processor configured to:
receive a user identification of at least one category from a list of identifiable categories;
responsive to a plurality of user identifications of a same one of the at least one category, adjust a weighting of the respective category from an initial weighting that is equal to weightings of all other identified ones of the at least one category, such that each identification of the same category beyond a first instance of identification adds an additional degree of weight to the same category relative to all others of the identified categories;
for each participant:
determine a score value of each of the identified at least one category based on statistics information concerning the respective identified at least one category;
calculate an overall score as a function of the respective participant's respective category score values and the weightings; and
determine a rank of the respective participant based on the respective participant's overall score; and
output for display a graphical user interface that includes, as the predicted outcome, a list of participants ordered according to their determined rank;
wherein the user interface includes user selectable options to place respective wagers on each of the participants in the list, and the user selectable options are displayed together with the list.

2. The device of claim 1, wherein the at least one computer processor is configured to output for display a graphical user interface in which categories are depicted as graphical icons and are identified by dragging individual icons into a designated area of the user interface.

3. The device of claim 1, wherein the at least one computer processor is configured to:
receive a list of sports events for which the outcome has yet to be determined; and
receive a user identification of the sports event from among the sports events included in the list.

4. The device of claim 1, wherein the at least one computer processor is configured to:
receive a user identification of an item from a list of items belonging to an additional category unrelated to any statistics information;
for each participant, determine an additional score value based on the identified item; and
determine the rank of each participant based additionally upon the respective additional score value of the respective participant.

5. The device of claim 1, wherein the at least one computer processor is configured to, when a plurality of categories are identified, identify to the user a respective participant with the highest score value within each respective identified category.

6. The device of claim 1, wherein the list is displayed without the score values and the overall scores, and the at least one computer processor is configured to, responsive to a user request for additional information, output for display, together with the overall score, the category score values of each participant included in the list.

7. A computer-implemented method for predicting an outcome of an event involving a plurality of participants, comprising:
performing the following by at least one computer processor:
receiving a user identification of at least one category from a list of identifiable categories;
responsive to a plurality of user identifications of a same one of the at least one category, adjusting a weighting of the respective category from an initial weighting that is equal to weightings of all other identified ones of the at least one category, such that each identification of the same category beyond a first instance of identification adds an additional degree of weight to the same category relative to all others of the identified categories;
for each participant:
determining a score value of each of the identified at least one category based on statistics information concerning the respective identified at least one category;
calculating an overall score as a function of the respective participant's respective category score values and the weightings; and
determining a rank of the respective participant based on the respective participant's overall score; and
outputting for display a graphical user interface that includes, as the predicted outcome, a list of participants ordered according to their determined rank;
wherein the user interface includes user selectable options to place respective wagers on each of the participants in the list, and the user selectable options are displayed together with the list.

8. The method of claim 7, further comprising:
outputting for display a graphical user interface in which categories are depicted as graphical icons and are identified by dragging individual icons into a designated area of the user interface.

9. The method of claim 7, further comprising:
receiving a list of sports events for which the outcome has yet to be determined; and
receiving a user identification of the sports event from among the sports events included in the list.

10. The method of claim 7, further comprising:
receiving a user identification of an item from a list of items belonging to an additional category unrelated to any statistics information; and
for each participant, determining an additional score value based on the identified item, wherein the rank of each participant is based additionally upon the respective additional score value of the respective participant.

11. The method of claim 7, further comprising:
when a plurality of categories are identified, identifying to the user a respective participant with the highest score value within each respective identified category.

12. The method of claim 7, wherein the list is displayed without the score values and the overall scores, the method further comprising:
responsive to a user request for additional information, outputting for display, together with the overall score, the category score values of each participant included in the list.

13. A non-transitory hardware computer-readable medium having stored thereon instructions executable by a processor, the instructions which, when executed, cause the processor to perform a method, the method comprising:

receiving a user identification of at least one category from a list of identifiable categories via a user interface of a device;

responsive to a plurality of user identifications of a same one of the at least one category, adjusting a weighting of the respective category from an initial weighting that is equal to weightings of all other identified ones of the at least one category, such that each identification of the same category beyond a first instance of identification adds an additional degree of weight to the same category relative to all others of the identified categories;

for each participant:

determining a score value of each of the identified at least one category based on statistics information concerning the respective identified at least one category;

calculating an overall score as a function of the respective participant's respective category score values and the weightings; and determining a rank of the respective participant based on the respective participant's overall score; and outputting for display a graphical user interface that includes, as the predicted outcome, a list of participants ordered according to their determined rank;

wherein the user interface includes user selectable options to place respective wagers on each of the participants in the list, and the user selectable options are displayed together with the list.

14. A device for predicting an outcome of an event involving a plurality of participants, comprising:

at least one computer processor configured to:

receive, via a user-interface of a device, a user-selection of a subset of plurality of categories;

responsive to a plurality of user selections of a same one of the categories, adjust a weighting of the respective category from an initial weighting that is equal to weightings of all others of the categories, such that each identification of the same category beyond a first instance of identification adds an additional degree of weight to the same category relative to all others of the categories;

calculate respective scores for the participants based on statistics regarding the participants with respect to, and the respective weightings of, the selected subset of categories, statistics with respect to non-selected ones of the plurality of categories being ignored;

rank the participants based on the calculated scores; and output for display a graphical user interface that includes an indication of a predicted outcome of the event based on the rankings, the indication being output as a list of participants ordered according to the rankings;

wherein the user interface includes user selectable options to place respective wagers on each of the participants in the list, and the user selectable options are displayed together with the list.

* * * * *